Sept. 26, 1944.  H. V. HOSKINS  2,359,108
POWER GENERATOR
Filed Feb. 17, 1942
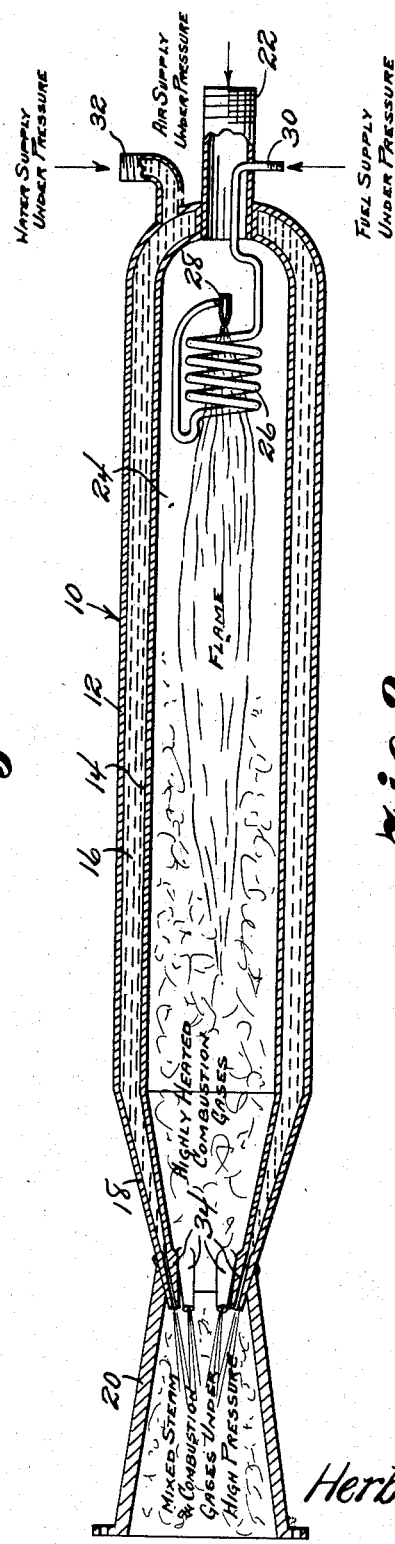
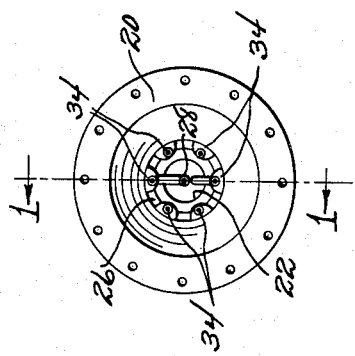
*Herbert V. Hoskins* INVENTOR.
BY
*Victor J. Evans & Co.*
ATTORNEYS Patented Sept. 26, 1944

2,359,108

UNITED STATES PATENT OFFICE 2,359,108

POWER GENERATOR

Herbert V. Hoskins, Savannah, Ga.

Application February 17, 1942, Serial No. 431,305

1 Claim. (Cl. 60—45)

My invention relates to the generation of power for operating turbines and the like, and has among its objects and advantages the provision of a novel power generator designed to convert heat energy into mechanical energy in a highly efficient manner to perform useful work.

In the accompanying drawing:

Figure 1 is a sectional view along the line 1—1 of Figure 2; and

Figure 2 is an end view.

In the embodiment selected for illustration, I make use of a generator chamber 10 of tubular formation and comprising an outer wall 12 and an inner wall 14 spaced therefrom to provide a chamber 16 for water to be converted into steam. One end of the generator 10 is constricted to provide a nozzle 18 communicating with a duct 20 for coaction with a steam turbine (not shown).

The other end of the generator 10 is closed and is provided with a pipe 22 for delivering air under pressure into the combustion chamber 24. The pipe 22 may be connected with any suitable source of compressed air (not shown). Inside the combustion chamber 24 is mounted a vaporizing coil 26 having a jet 28 arranged coaxially with the coil 26 for spraying fuel forwardly through the coil 26. One end of the coil is connected with a fuel feeding line 30 connected with a suitable source of fuel under pressure (not shown). The water in the chamber 16 is also maintained under pressure therein and is delivered thereto through the medium of a pipe 32 connected with a suitable water pressure source (not shown). At the constricted end 18 of the generator is arranged a series of hot water jets 34 converging toward the axis of the generator and discharging hot water into the duct 20.

In operation, fuel is burned in the chamber 24 to produce highly heated gases. Since the water chamber 16 surrounds the combustion chamber, the water will be heated to a high temperature. The water is under pressure and is discharged in fine jets into the duct 20 to intermingle with the stream of gases discharging from the nozzle. The water, which is heated to a high temperature in the generator, is instantly turned into steam in the duct 20. Thus a mixture of gases of combustion and steam pressure is generated in a highly efficient manner and with a relatively low heat loss.

A power generator of the type disclosed may be employed in airplanes, one advantage residing in the fact that the power system is relatively noiseless. Such a system is also free from vibration and is perfectly balanced. The gases of combustion and steam are maintained under high pressure by reason of the air supply of pipe 22. Obviously the pipes 22, 30 and 32 may be provided with valves for controlling the admission of air, water and fuel to the end that the production of power may be controlled within desired limits. While I have described the power generator in association with a steam turbine, the system is equally well adapted to other types of engines. I have provided a power generator wherein a relatively large amount of heat energy, produced by burning of fuel, is converted into mechanical energy.

The taper of the nozzle 18 increases the discharging velocity of the gases of combustion.

Without further elaboration, the foregoing will so fully illustrate my invention, that others may, by applying current knowledge, readily adapt the same for use under various conditions of service.

I claim:

In a generator, a double walled structure forming an elongated tubular combustion chamber having a restricted axial discharge opening at the rear end, said wall structure including inner and outer walls spaced apart to provide a water jacket closing the front end of the chamber, an inlet communicating with the jacket for supplying water under pressure thereinto, a plurality of longitudinally directed jets disposed in annular concentric arrangement in the discharge opening and connecting with the water jacket, a conduit extended axially through the front double wall of the chamber for supplying air under pressure into the front end of the chamber, a helical coil of tubing mounted in the forward portion of the chamber spaced inwardly from and co-axial with the air inlet conduit, said tubing having a length extending forwardly into the air supply conduit and directed transversely outward therefrom for connection with a source of fuel supply, the opposite end of the coil tubing being directed forwardly exteriorly of the coil to its front end, and a fuel discharge nozzle connected with the last mentioned end of the tubing co-axially with the coil to discharge the fuel through the coil with the air forced into the chamber through the air conduit for combustion in the chamber and admixture with the water issuing from the jets exteriorly of the chamber discharge opening.

HERBERT V. HOSKINS.